United States Patent
Schreiber

(10) Patent No.: US 7,265,915 B2
(45) Date of Patent: Sep. 4, 2007

(54) DETECTION DEVICE FOR A CONFOCAL MICROSCOPE

(75) Inventor: Frank Schreiber, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/265,877

(22) Filed: Nov. 3, 2005

(65) Prior Publication Data

US 2006/0091296 A1   May 4, 2006

(30) Foreign Application Priority Data

Nov. 3, 2004  (DE) .................... 10 2004 053 705

(51) Int. Cl.
*G02B 3/00*   (2006.01)
*H01J 3/14*   (2006.01)
(52) U.S. Cl. .................... 359/722; 250/216
(58) Field of Classification Search ................ 250/216; 359/722–724
See application file for complete search history.

(56) References Cited

U.S. PATENT DOCUMENTS 6,108,127 A * 8/2000 Atkinson .................... 359/389
7,042,658 B2 * 5/2006 Chen et al. ................. 359/723

* cited by examiner

*Primary Examiner*—Thanh X. Luu
*Assistant Examiner*—Brian Livedalen
(74) *Attorney, Agent, or Firm*—Houston Eliseeva LLP

(57) ABSTRACT

A detection device for an optical configuration, in particular for a confocal microscope, with a detector, a pinhole aperture 2 arranged before the detector in a beam path 1 of the detection light, and a lens 3 for focusing the detection light on the pinhole aperture 2 arranged before the pinhole aperture 2, is implemented with regard to high resolution and detection efficiency even in the presence of varying wavelengths such that a means 4 for wavelength-dependent illumination of the lens 3 is arranged before the lens 3 in the beam path 1. Furthermore, a wavelength-dependent beam expander 6 as well as a confocal microscope with such a detection device are disclosed.

4 Claims, 2 Drawing Sheets

DETECTION DEVICE FOR A CONFOCAL MICROSCOPE

RELATED APPLICATIONS

This application claims priority to German application No. DE 10 2004 053 705.4, filed on Nov. 3, 2004, which is incorporated herein by reference in its entirety.

BACKGROUND OF THE INVENTION

The present invention relates a detection device for an optical configuration, in particular for a confocal microscope with a detector, a pinhole aperture located before the detector in a beam path of a detection light, and a lens located before the pinhole aperture to focus the detection light on the pinhole aperture. The present invention further relates to a beam expander and a confocal microscope that is dependent on a wavelength.

SUMMARY OF THE INVENTION

Detection devices of the aforementioned type are known from practice and exist in different embodiments. Such detection devices are used, among other applications, in confocal microscopes, particularly in confocal scanning microscopes. Here, the detection light is guided via a lens to the pinhole aperture and then to a detector located behind the pinhole aperture. A photomultiplier with which a detection light that has varying wavelengths can be detected is frequently used as a detector. Such detection light with varying wavelengths is, for example, emitted by different dyes that are present in the sample being tested.

The resolution and detection efficiency of a confocal microscope are influenced considerably by the diameter of the pinhole aperture and at a fixed diameter change linearly with the wavelength of the detection light. As a result, resolution and detection efficiency can only be optimized for one wavelength when using a pinhole aperture with a fixed diameter. During simultaneous detection of several dyes, for example, this results in different spatial resolution capacity for different dyes. No uniform resolution capacity can be achieved, even when using several pinhole apertures for different detection paths or detection wavelengths, respectively, because dyes emit a detection band and not discrete wavelengths.

In the known detection devices, the dependency of resolution on wavelength is either ignored or—as aforementioned—several detection pinhole apertures are used for different detection paths or detection wavelengths, respectively. In addition to the inability to optimize resolution of detection bands emitted by dyes, in the latter case it is furthermore disadvantageous that several pinhole apertures must regularly be adjusted by the user. This makes the detection device or a confocal microscope implemented with the detection device costly in terms of operation.

The underlying object of the present invention is therefore to disclose a detection device as well as a confocal microscope with such a detection device, wherein high resolution and detection efficiency can be achieved using simple components, even with detection light having varying wavelengths.

According to the invention, the present object is solved by a detection device with the characteristics in patent claim 1. Accordingly, the detection device of the aforementioned type is implemented and developed such that a means for wavelength-dependent illumination of the lens is arranged before the lens in the beam path.

In a manner according to the invention, it was a first recognized that it is not necessary to provide several detection paths with several pinhole apertures in a detection device to optimize resolution and detection efficiency, even at varying detection light wavelengths. Furthermore, it was then concretely recognized that the above object can be solved in a surprisingly simple manner according to the invention by arranging a means for wavelength-dependent illumination of the lens in the beam path before the lens. When testing resolution, it is important that each self-luminous point object be imaged as an Airy disc, and that the scope of the illumination of the lens directly influence the radius of the Airy disc via the size of the numerical aperture generated. The capacity to illuminate the lens in a wavelength-dependent manner makes it possible to keep the radius, and therefore also the size of the Airy disc, constant for all wavelengths. This makes it possible in the presence of a given pinhole aperture to keep resolution and detection efficiency constant to a high degree by adjusting only once—even with detection light having different wavelengths.

Consequently, the detection device according to the invention discloses a detection device that achieves high resolution and detection efficiency using simple components, even with detection light having different wavelengths.

Concretely, illumination of the lens can be specified such that the numerical aperture of the illuminating cone produced by the lens is largely proportional to the wavelength of the detection light. As a result, the radius of the Airy disc is kept constant in the pinhole aperture because the radius of the Airy disc is proportional to the quotient of the wavelength and the numerical aperture. That is, when the numerical aperture increases proportional to the wavelength of the detection light, the radius of the Airy disc remains constant. This further takes into account that the numerical aperture at a given refractive index is proportional to the sinus of the aperture angle of the illuminating cone, $NA = n \cdot \sin(u)$, whereby NA is the numerical aperture, n is the refractive index, and u is the largest possible angle between a light beam and the optical axis at which the light beam can still be collected by the lens or the objective. This further takes into account that the sinus equals the tangent at very small angles. For radius r of the Airy disc, the wavelength is $\lambda$ and the numerical aperture NA: $r \sim \lambda/NA$.

In a particularly simple construction, the means could be a wave-dependent beam expander. Depending on wavelength, a different beam diameter can be produced that leads to varying illumination of the lens before the pinhole aperture.

In a further simple construction, the beam expander can exhibit two lenses or lens systems that are arranged at a distance from each other that corresponds to the sum of their focal distances. This achieves particularly simple and reliable wavelength-dependent beam expansion.

Concretely, the focal distance of the first lens or of the first lens system could increase with the wavelength of the detection light, whereby, going in the opposite direction, the focal distance of the second lens or of the second lens system could decrease with the wavelength of the detection light. This achieves particularly reliable beam expansion and illumination of the lens such that the numerical aperture of the illuminating cone produced by the lens is largely proportional to the wavelength of the detection light. The result is that the radius of the Airy disc remains constant, even in the presence of different wavelengths.

A means for wavelength-dependent illumination of the lens of a detection device is made available using the wavelength-dependent beam expander, whereby the wavelength-dependent beam expander is simply constructed.

Consequently, the wavelength dependence of resolution and detection efficiency are eliminated by the invention described herein. With the present invention, all wavelengths result in the same detection efficiency and resolution. The size of the Airy disc remains independent of wavelength.

There are numerous ways in which the teaching of the present invention can be advantageously configured and developed. For this purpose, see the subclaims and the following diagrammatic explanation of the teaching according to the invention with regard to a preferred embodiment of the invention.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
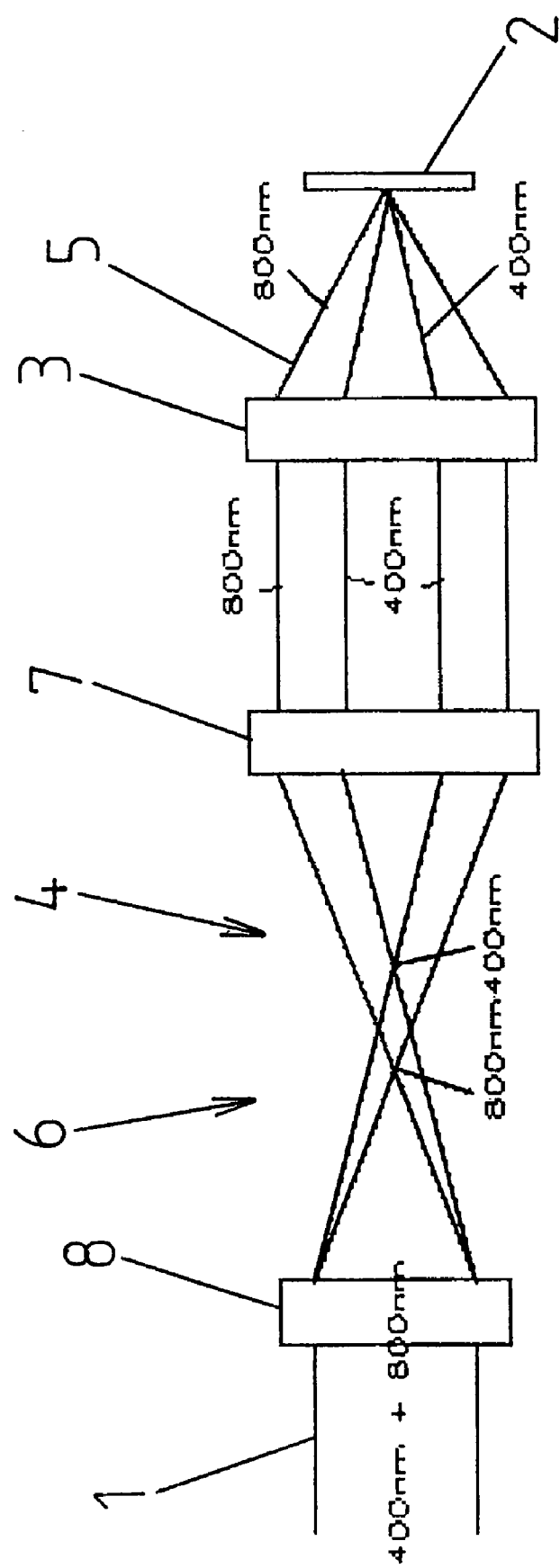
FIG. 1 a schematic representation of an exemplary embodiment of a detection device for an optical configuration according to the invention.

FIG. 1 shows a schematic representation of an embodiment of a detection device for an optical configuration according to the invention. The detection device can be used in particular within a confocal microscope. The detection device exhibits a detector that for the sake of clarity is not shown here, which can be implemented as a photomultiplier. Furthermore, the detection device exhibits a pinhole aperture 2 before the detector in a beam path 1 of a detection light, and a lens 3 arranged before the pinhole aperture 2 for focusing the detection light on the pinhole aperture 2. With regard to high resolution and detection efficiency even in the presence of detection light with varying wavelengths, a means 4 for illuminating the lens 3 dependent on wavelength is arranged in the beam path 1 before the lens 3. Illumination of the lens 3 can be specified such that the numerical aperture of the illuminating cone 5 generated by the lens 3 is largely proportional to the wavelength of the detection light. In FIG. 1, this is a represented by two wavelengths of 400 nm and 800 nm. The diameter of the beam of the light beam with a wavelength of 800 nm is larger than the diameter of the light beam with a wavelength of 400 nm.

Because the radius r of the Airy disc is proportional in the pinhole aperture to the quotients of the wavelengths and the numerical aperture, the radius of the Airy disc remains constant when the numerical aperture of the illuminating cone 5 generated by the lens 3 is largely proportional to the wavelengths of the detection light.

In the embodiment shown in FIG. 1, the means 4 for illuminating the lens 3 dependent on wavelength is a wave-dependent beam expander 6. The beam expander 6 exhibits two lens systems 7 and 8 that are arranged at a distance from each other that corresponds to the sum of their focal distances. The focal distance of the first lens system 7 increases with the wavelength of the detection light. The focal distance of the second lens system 8 decreases with the wavelength of the detection light. As a result, increases and decreases in focal distance occur to the same measure or extent as the wavelength.

The optical configuration shown in FIG. 1 can also be designated as an achromatic variable detection pinhole aperture, whereby the lens 3 could be designated as an achromatic lens.

Figure 2:
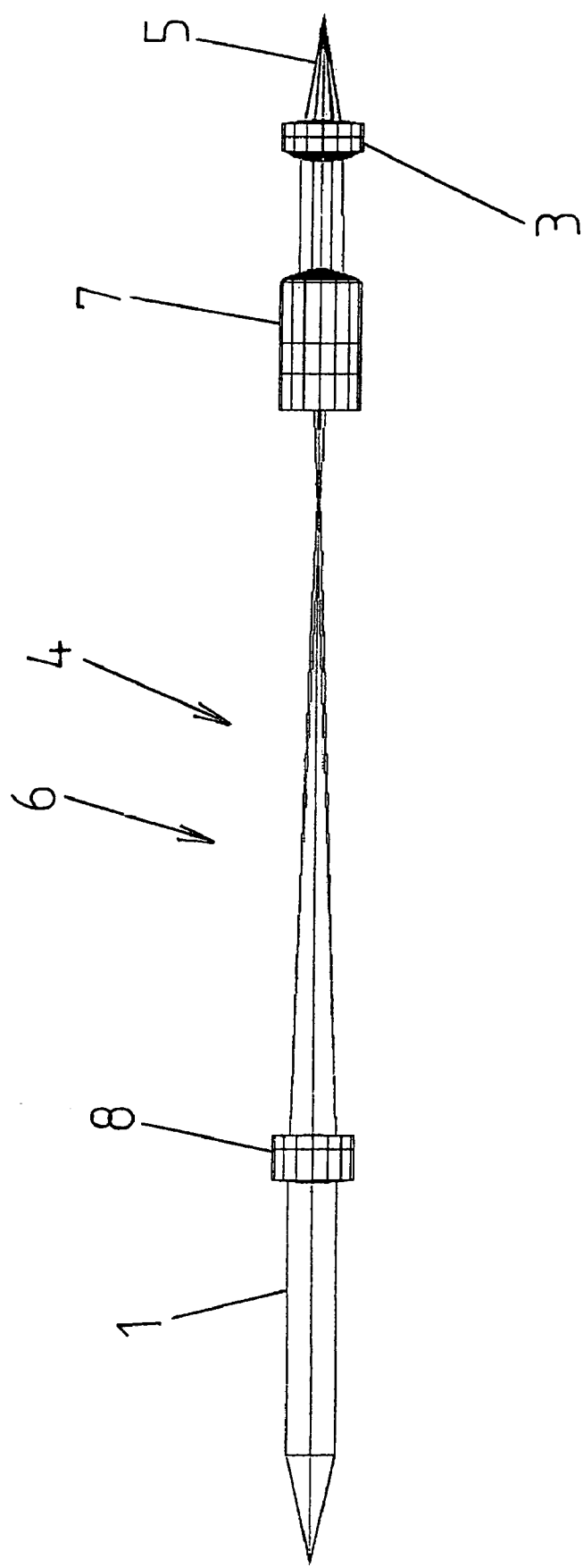
FIG. 2 a further schematic representation of a part of the embodiment from FIG. 1.

FIG. 2 shows a further schematic representation of a part of the embodiment from FIG. 1, whereby a the pinhole aperture 2 shown in FIG. 1 has been omitted for the sake of clarity.

To avoid repetition, refer to the general part of the description as well as to the appended patent claims in regard to further developments of the teaching according to the invention.

Finally, it is stressed that the embodiment of the invention described here serves to explain the claimed teachings, which are not, however, limited to this embodiment of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. Detection device for a confocal microscope, comprising:
   a detector, a pinhole aperture that is arranged before the detector in a beam path of a detection light;
   lens for focusing the detection light on the pinhole aperture, the lens being arranged before the pinhole aperture; and
   means for illuminating the lens dependent on wavelength is arranged before the lens in the beam path, the means for illuminating the lens being a wavelength-dependent beam expander exhibiting two lenses or lens systems that are arranged at a distance from each other that corresponds to the sum of their focal distances:
   wherein the focal distance of the second lens or of the second lens system decreases with the wavelength of the detection light.

2. Detection device according to claim 1, wherein the illumination of the lens can be specified such that the numerical aperture of the illuminating cone generated by the liens is largely proportional to the wavelength of the detection light.

3. Detection device according to claim 1, wherein the focal distance of the first lens or of the first lens system increases with the wavelength of the detection light.

4. Detection device according to claim 1, wherein the increase in focal distance of the first lens or of the first lens system with the wavelength of the detection light is achieved to the same extent as the decrease in focal distance of the second lens or of the second lens system with the wavelength of the detection light.

* * * * *